United States Patent Office 3,052,682
Patented Sept. 4, 1962

3,052,682
SIMPLIFIED PROCESS OF PREPARING PURE
PAPAVERINE FROM CRUDE PAPAVERINE
Helmut Frömmel, Aussere Schneeberger Strasse 49,
Zwickau, Germany
No Drawing. Filed Mar. 14, 1960, Ser. No. 14,506
10 Claims. (Cl. 260—289)

This invention relates to a simplified process of preparing pure papaverine from crude papaverine.

Besides the preparation of papaverine its purification, too, involves considerable problems, since for example the preparation of a papaverine-hydrochloride requires the application of methods fulfilling the conditions of purity of the most important pharmacopeias, which consume much time, are relatively expensive and cause much loss.

The most sensitive criterion of purity the demands of which can generally be met only with the greatest difficulty is a test according to which 50 mg. of papaverine-hydrochloride must dissolve in 20 ml. of cold concentrated sulfuric acid without the least coloring, and only during heating may a violet coloring gradually appear. Insufficiently purified papaverine, however, shows in the cold already a more or less deep violet coloring. In the literature concerned it is then usually stated that the coloring is due to the presence of cryptopine, an alkaloid which at the separation of papaverine from opium goes with the papaverine, and the sulfuric acid test is therefore often designated "cryptopine test." But this can never be correct for synthetically prepared papaverine, because the formation of cryptopine in the course of the synthesis is inconceivable. There must be another explanation of the red-violet coloring appearing with the sulfuric acid.

Experiments made with pure cryptopine and with mixtures thereof with papaverine showed a totally different behavior. On the one hand there were quantities which at best could be regarded as impurities and were instantly removable by simple recrystallization; and on the other hand, for obtaining the same intensity of color by the sulfuric acid test, quantities had to be used giving a divergent melting point, which was formerly not the case. Furthermore, the cryptopine coloring fades within a short time, whereas the impurity in the papaverine, which rendered separation so particularly difficult, gives color-holding sulfuric acid solutions for days.

In the course of various tests carried out to simplify the purification of papaverine it could first be ascertained that the coloring impurity is papaverinol, an oxidation product of papaverine, a body whose physical properties extraordinarily resemble those of papaverine, which, considering the purifying methods by recrystallization usual for such substances, show little inclination to go into the mother liquor. It forms mixed crystals with papaverine without depression, and the Rf-values are alike.

It was this knowledge that made it possible to develop thereon a purifying method which is essentially simplified compared with the known methods.

For the purification of papaverine as described for instance in U.S. Patents Nos. 2,507,135, 2,507,136 and 2,507,086 there are still three different stages needed which counting the base require seven steps. This arrangement, however, does not unconditionally ensure that always a papaverine is obtained, which satisfies the severest requirements demanding a colorless solution in cold sulfuric acid. Occasionally even a degree of purity corresponding to the United States Pharmacopeia, edition 13, which regards a pale pink coloring of the sulfuric acid or one not stronger than a light brown as sufficient is acceptable.

According to No. 2,507,086 of the above-mentioned patents, the following steps for synthetic papaverine as it results as base of various methods are necessary: Conversion of the base into the oxalate, first recrystallization and working up of the corresponding mother liquor, second recrystallization with working of the mother liquor, conversion of the oxalate into the base, chromatographic purification of the solution made therefrom, conversion into the hydrochloride followed by recrystallization using methanol. The proceeding is the same in the other patents cited, which differ only as to the solvents used for chromatography.

Although in addition to recrystallization usually repeated several times the chromatographic process has to be put in, it is repeatedly pointed out that this method represents an important simplification of the purification of crude papaverine, because instead of the three stages required by the U.S. patent 6 to 7 stages including up to 20 steps were formerly needed.

Considering that the impurity of papaverine, which can be separated only with the greatest difficulty, is papaverinol, it is nevertheless possible to change the properties of this hydroxy derivative of papaverine by a simple directed chemical transformation or reaction so that its separation can be performed without any difficulty. As such reactions come into question all etherifications and esterifications with the generally available reactions for the information of OH-groups, though it should be borne in mind that the tertiary nitrogen of the papaverine-base is not equally subjected to the reaction. It was found that the application of simple organic or mixed organic-inorganic acid anhydrides was most suitable.

The method is also remarkably simple, because the papaverine, which becomes available from the corresponding dihydro-compound by dehydrogenation, is after separation from the catalyst immediately mixed in the solvent used for dehydrogenation with a quantity of a chemical capable of reaction with the OH-group, for instance an organic acid anhydride, and kept at a temperature depending on the reactivity of this chemical and on the quantity of impurity, but generally not below 100° and over 170°, for some time, which also depends again on temperature, reactivity of the chemical added and the quantity of impurities. The reaction may be so arranged that one can get on with a maximum time of one hour, but generally 30 minutes will do.

Equally simple is purification, if papaverine according to Mannich is directly obtained by ring closure from the corresponding acid amide with phosphoroxychloride. As here, too, the base is set free for further purification, it becomes possible by selection of a solvent with corresponding boiling point for reception of the base to carry the reaction through in the same manner after removal of the water by one of the usual drying agents. After the reaction the base is brought to crystallization by cooling and sucked off. When the mother liquor has been washed out with the usual solvents, a papaverine-base is formed, which at most may still show a pale violet coloring in cold sulfuric acid, chiefly due to traces of the papaverinol-ester still present. After dissolving the base in a corresponding quantity of warm diluted hydrochloric acid and after one recrystallization using water a papaverine hydrochloride results, which fulfills all purity requirements of the usual pharmacopeias and particularly corresponds also to the "cryptopine test," that is it dissolves completely colorless in cold concentrated sulfuric acid.

The method described, however, simplifies not only the purification of synthetic papaverine, but can be profitably applied also for purifying natural papaverine contaminated by cryptopine as it results at the separation of oxalates from the opium alkaloids. This natural papaverine actually contains besides cryptopine, which has considerably deviating physical properties and can therefore be readily separated, in most cases also papaverinol, which is readily formed out of papaverine-base and of the salts thereof by air or peroxide oxidation. In conformity herewith purest dissolved papaverine when in contact with the usual purifying agents, as active coal or the like, but also with dust contaminating the air, will instantly cause again red coloration of sulfuric acid in the cold.

Example 1: From 10 liters tetraline solution of the papaverine-base as it comes from dehydrogenation the catalyst is separated by filtration. Then acetyl chloride to the extent of 7 to 8 percent of the dissolved quantity of papaverine-base are added and kept 15 minutes at 135° to 150°. The solution will cool, the base is crystallized out, then filtered off from the solvent and washed with the usual solvents, the base taken up by the corresponding quantity of aqueous hydrochloric acid, permitted to crystallize out and once recrystallized, depending on the grade of the other impurities with or without the addition of a purifier, as active coal or a similar one. Pure white crystals of papaverine-hydrochloride are obtained which already after the first crystallization show a colorless sulfuric acid solution.

Example 2: 4 to 6 percent of benzoyl chloride calculated on the quantity of papaverine-base expected are added to the tetraline solution thereof. Proceed as in Example 1.

(3) Instead of benzoyl chloride 5 to 7 percent acetic anhydride are added; otherwise proceed as in the preceding examples.

(4) For dissolving the base 5 to 10 percent methyl acetate are added, and the papaverinol is by alcoholysis converted into the corresponding acetate. The duration of the reaction can be ascertained by the quantity of alcohol, in this case methanol, eliminated from the equilibrium and measured after condensation. Then proceed as in Example 1.

I claim:

1. A process for the purification of crude papaverine to substantially remove papaverinol present as an impurity which comprises reacting crude papaverine containing said papaverinol with an agent selected from the group consisting of a carboxylic acid chloride and a carboxylic acid anhydride at temperatures between 100° C. and 170° C. and for a period of 15 minutes to 60 minutes, whereby the OH group of the papaverinol is esterified, while the nitrogen of the papaverine remains unreacted, and isolating substantially purified papaverine from the reaction medium by crystallization.

2. The process as claimed in claim 1 wherein the agent added for the conversion of papaverinol is present in the amount of 5 to 10% calculated on the weight of the papaverine base expected.

3. A process for the purification of crude papaverine to substantially remove papaverinol present as an impurity which comprises reacting crude papaverine containing said papaverinol with acetylchloride in an amount of 7–8% by weight, calculated on the weight of the papaverine base expected, at temperatures between 135° C. and 150° C. and for a period of about 15 minutes, whereby the OH group of the papaverinol is esterified, while the nitrogen of the papaverine remains unreacted, and isolating substantially purified papaverine from the reaction medium by crystallization.

4. The process of claim 3 wherein the papaverine after crystallization is filtered, washed, taken up by aqueous hydrochloric acid and recrystallized therefrom in a state of high purity.

5. A process for the purification of crude papaverine to substantially remove papaverinol present as an impurity which comprises reacting crude papaverine containing said papaverinol with benzoyl chloride in an amount of 4 to 6% by weight, calculated on the papaverine base expected, at temperatures between 135° C. and 150° C. and for a period of about 15 minutes, whereby the OH group of the papaverinol is esterified, while the nitrogen of the papaverine remains unreacted, and isolating substantially purified papaverine from the reaction medium by crystallization.

6. The process as claimed in claim 5 wherein the papaverine after crystallization is filtered, washed, taken up by aqueous hydrochloric acid and recrystallized therefrom in a state at high purity.

7. A process for the purification of crude papaverine to substantially remove papaverinol present as an impurity which comprises reacting crude papaverine containing said papaverinol with acetic anhydride in an amount of 5–7% by weight calculated on the papaverine base expected, at temperatures between 135° C. and 150° C. and for a period of about 15 minutes, whereby the OH group of the papaverinol is esterified, while the nitrogen of the papaverine remains unreacted, and isolating substantially purified papaverine from the reaction medium by crystallization.

8. The process as claimed in claim 7 wherein the papaverine after crystallization is filtered, washed, taken up by aqueous hydrochloric acid and recrystallized therefrom in a state of high purity.

9. A process for the purification of crude papaverine to substantially remove papaverinol present as an impurity which comprises subjecting a solution of crude papaverine, as it is obtained during its preparation in the presence of a catalyst, to filtration for removal of the catalyst, reacting the filtrate, which still contains papaverinol as an impurity, with an agent selected from the group consisting of a carboxylic acid chloride and a carboxylic acid anhydride at temperatures between 100° C. and 170° C. and for a period of 15 minutes to 60 minutes, whereby the OH group of the papaverinol is esterified, while the nitrogen of the papaverine remains unreacted, and isolating substantially purified papaverine from the reaction medium by crystallization.

10. The process as claimed in claim 9, wherein the paraverine after crystallization is filtered, washed, taken up by aqueous hydrochloric acid and recrystallized therefrom in a state of high purity.

References Cited in the file of this patent
UNITED STATES PATENTS

| | | |
|---|---|---|
| 2,507,086 | Baizer | May 9, 1950 |
| 2,507,135 | Baizer | May 9, 1950 |
| 2,507,136 | Baizer | May 9, 1950 |